US006796167B2

(12) United States Patent
Tigerholm

(10) Patent No.: US 6,796,167 B2
(45) Date of Patent: Sep. 28, 2004

(54) DEVICE FOR INDICATION OF LEAKAGE IN A LIQUID SYSTEM AND METHOD FOR SUCH INDICATION

(75) Inventor: Lars Tigerholm, Stockholm (SE)

(73) Assignee: Tigerholm Innovation AB, Ekero (SE)

( * ) Notice: Subject to any disclaimer, the term of this patent is extended or adjusted under 35 U.S.C. 154(b) by 0 days.

(21) Appl. No.: 10/105,429

(22) Filed: Mar. 26, 2002

(65) Prior Publication Data

US 2002/0134139 A1 Sep. 26, 2002

(30) Foreign Application Priority Data

Mar. 26, 2001 (SE) .............................................. 0101084
Aug. 22, 2001 (SE) .............................................. 0102783

(51) Int. Cl.$^7$ ........................... G01M 3/06; G01N 1/22; G01N 15/08
(52) U.S. Cl. ........................ 73/40; 73/863.23; 73/40.7
(58) Field of Search .................... 73/40, 64.47, 863.23, 73/40.7

(56) References Cited

U.S. PATENT DOCUMENTS

| 2,679,747 | A | * | 6/1954 | Andrus ........................... 73/40 |
| 3,195,346 | A | * | 7/1965 | Ehrmantraut et al. ....... 73/53.01 |
| 3,388,587 | A | * | 6/1968 | Hara et al. ..................... 73/40 |
| 4,860,577 | A | * | 8/1989 | Patterson .................... 73/64.3 |
| 4,958,296 | A | * | 9/1990 | Saitoh et al. ............... 364/509 |
| 5,054,328 | A | * | 10/1991 | Long et al. ............... 73/864.81 |
| 5,381,699 | A | * | 1/1995 | Dansereau et al. ....... 73/864.01 |
| 5,526,678 | A | * | 6/1996 | Shaw et al. .................... 73/40 |
| 5,542,289 | A | * | 8/1996 | Hool et al. ................. 73/64.52 |
| 5,974,863 | A | * | 11/1999 | Persson .................... 73/40.5 R |
| 5,992,217 | A | * | 11/1999 | Jax et al. ........................ 73/40 |
| 6,094,970 | A | * | 8/2000 | Sprenger et al. ............... 73/40 |
| 6,119,506 | A | * | 9/2000 | Gibson et al. .................. 73/38 |

FOREIGN PATENT DOCUMENTS

| DE | 29 11 597 | 10/1980 |
| DE | 42 38 044 | 12/1993 |
| DE | 196 46 248 | 5/1998 |
| DE | 198 35 525 | 10/1999 |

* cited by examiner

Primary Examiner—Hezron Williams
Assistant Examiner—David J. Wiggins
(74) Attorney, Agent, or Firm—Young & Thompson

(57) ABSTRACT

A method and a device for indication of leakage in a liquid system, includes liquid lines and a liquid filter that consists of a non-transparent upper portion (3) having flow paths (5, 6) for the supply of liquid to the filter and discharge of liquid from the filter, and a transparent lower portion (4) having a transparent casing (7) and a filter unit (11) positioned inside the casing (7). It is significant for the device that an indicating channel (27) is connected to the inlet flow path (5), the indicating channel (27) extending below the upper portion (3) and having an outlet opening (31) that emerges in the lower portion (4) and being arranged to discharge supplied liquid so as to be visible to a person's eye and also visually indicate gas bubbles/air bubbles (39) that possibly are present.

10 Claims, 2 Drawing Sheets

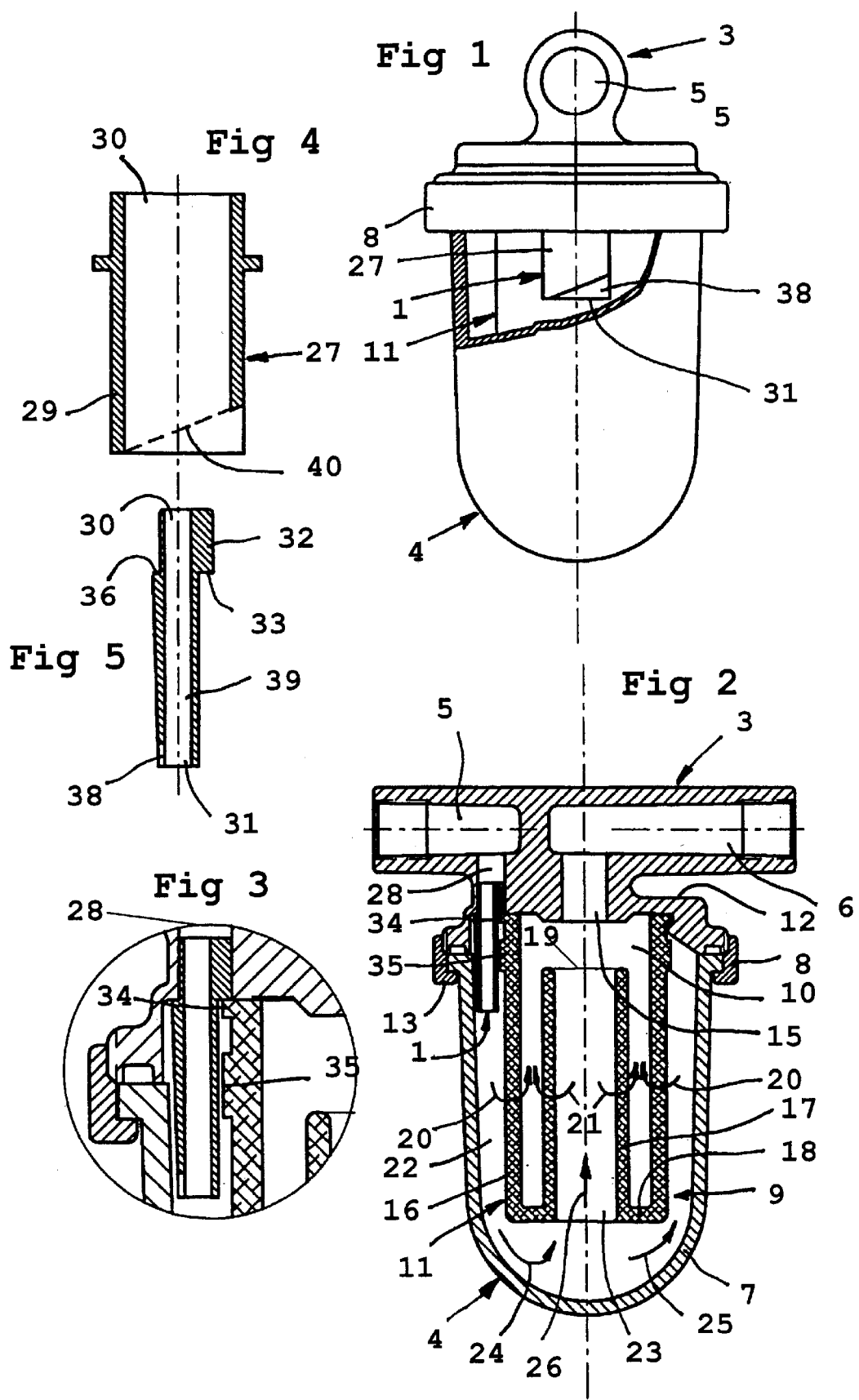

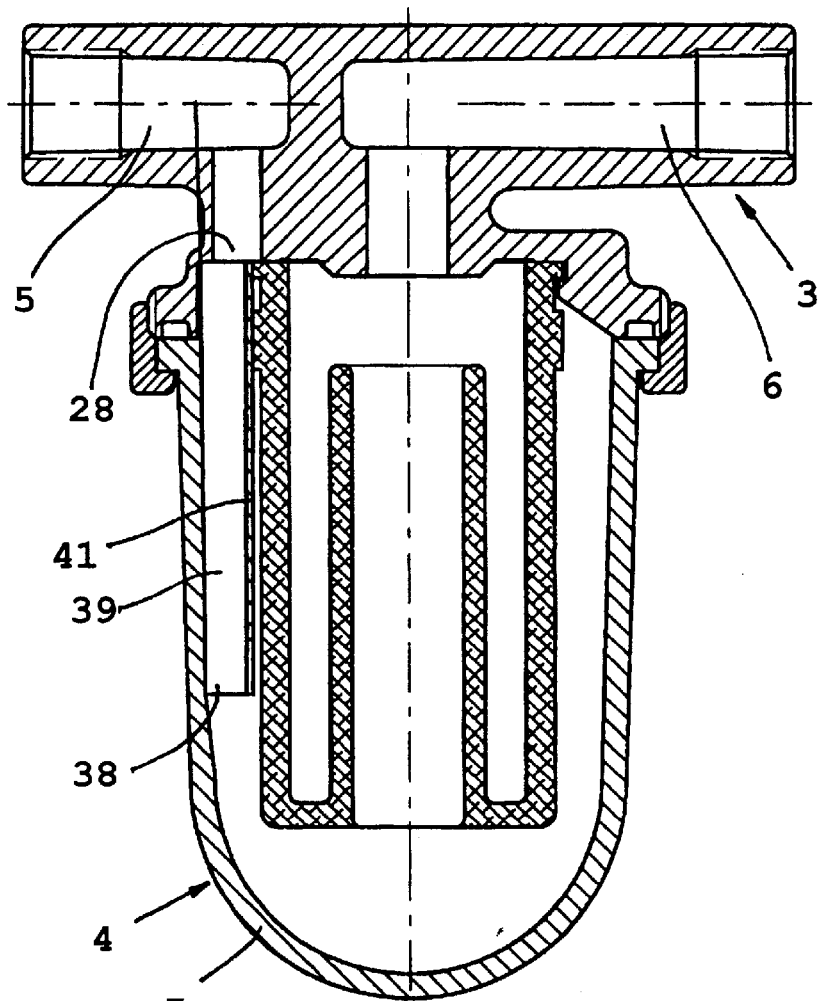
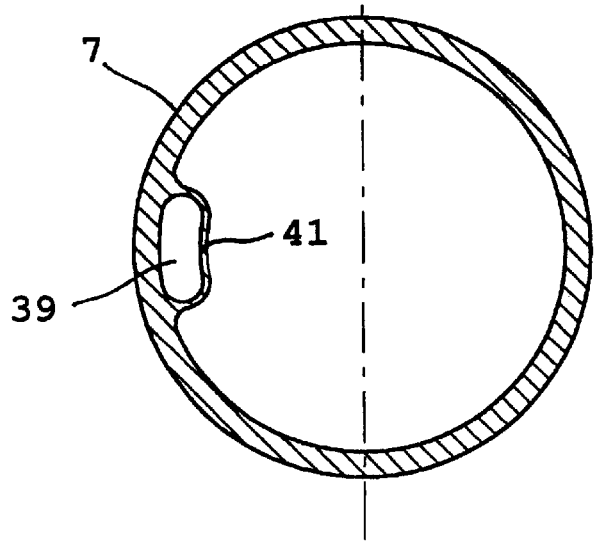

DEVICE FOR INDICATION OF LEAKAGE IN A LIQUID SYSTEM AND METHOD FOR SUCH INDICATION

TECHNICAL FIELD

The present invention relates to a device for indication of leakage in a liquid system, which includes liquid lines and a liquid filter that consists of a non-transparent upper portion having flow paths for the supply of liquid to the filter and discharge of liquid from the filter, and a transparent lower portion having a transparent casing and a filter unit positioned inside said casing.

The present invention also relates to a method for indication of leakage in a liquid system, which includes liquid lines and a liquid filter that consists of a non-transparent upper portion having flow paths for the supply of liquid to the filter and discharge of liquid from the filter, and a transparent lower portion having a transparent casing and a filter unit positioned inside said casing.

PRIOR ART

In liquid systems, e.g. oil heating systems, gas/air may occur, normally due to leakage, that due to negative pressure may result in air bubbles that may cause operations disturbance. Even if a liquid filter is present in the line, said liquid filter separating pollutants, the air bypasses the filter without detection since air bubbles passes in the upper portion of the filter, said portion usually being non-transparent. In order to perform an ocular inspection in the flowing liquid it occurs under certain circumstances that a specific, transparent inspection tube is mounted in the line system. This however brings about an additional cost and the need for coupling means, feeling means and a further risk for leakage.

OBJECT OF THE INVENTION

The object of the invention is to present a device for indication of leakage, said device demanding no further installations and may be achieved at a low cost.

The object of the present invention is also to present a method, by which leakage may be indicated and identified in a simple way.

Said objects are achieved by means of the device according to the invention, said device being characterised by an indicating tube that is connected to the inlet flow path, said indicating tube extending below the upper portion and having an outlet opening that emerges in the lower portion and is arranged to discharge supplied liquid so as to be visible to a person's eye and also indicate, visible to a person's eye, gas bubbles/air bubbles that possibly are present.

Said object is also achieved by means of the method according to the invention, said method being characterised in that supplied liquid is fed through an indicating tube down to the lower transparent portion and discharged in the transparent portion in order to make visible to a person's eye possible gas bubbles/air bubbles.

SPECIFICATION OF FIGURES

Below the invention will be described more in detail by means of two embodiments, reference being made to the accompanying drawings, where:

FIG. 1 shows a partly sectioned side view of the device according to the invention, mounted in a liquid filter;

FIG. 2 shows a section through the device and the liquid filter;

FIG. 3 shows an enlarged detail of the indicating device;

FIGS. 4 and 5 show the indicating device separately, in the shape of two longitudinal sections that are perpendicular to each other; and FIGS. 6 and 7 show a vertical and a horizontal section of a second embodiment of the indicating device.

PREFERRED EMBODIMENT

As is evident from FIGS. 1 and 2 the indicating device 1 according to the invention is adapted to be mounted in a liquid filter 2. The liquid filter essentially consists of an upper, non-transparent portion 3 and a lower, transparent portion 4. The upper portion 3 houses liquid flow paths in the shape of an inlet flow path 5 and an outlet flow path 6. The liquid filter 2 is included in a liquid supply system for a device that liquid is supplied to. An example of such a device could be an oil burner having a pump that creates the necessary pressure for supplying oil to the burner. In connection therewith the pump at its inlet side creates a negative pressure that brings liquid to flow in the lines through the liquid filter. During unfavourable conditions the negative pressure may result in leakage in coupling means and other connections which may create gas bubbles/air bubbles. This may cause operation disturbances in the device to which liquid is supplied. Through the indicating device according to the invention it is easy to observe passing gas bubbles/air bubbles, which will be described more in detail below.

The lower portion 4 of the liquid filter constitutes in a conventional way of a transparent casing 7 in the shape of a cup shaped receiver of glass or plastic. This receiver has an upper end that is open, however the receiver being attached to the upper portion via a union nut 8 in order to create a closed receiver that encases a liquid space 9 that communicates with the inlet flow path 5 and the outlet flow path 6. The upper portion 3 and the union nut 8 extends below the upper portion 10 of the encased liquid space 9. In the lower portion a filter unit 11 is provided, said filter unit 11 in its upper part being attached to the upper portion 3 of the filter device. Thereby the upper edge 12 of the filter unit 11 is located at a level above the lower part of the upper portion 3 or more precisely the lower edge 13 of the nut 8. Thus, it is not possible to observe laterally, from the outside, the upper end of the filter unit 11 or the upper portion 10 of the encased liquid space 9. The filter unit 11, as well as the casing 7, is preferably symmetric as of rotation around an axis 14 of symmetry. The filter unit 11 constitutes a continuous filter wall, in the shown example an outer casing wall 16 and an inner casing wall 17 that is connected to the outer wall at the lower end of the filter unit by means of an annual end wall 18. The inner casing wall 17 has a closure 19 at its top, said closure 19 facing towards the inner end 15 of the outlet 6. The walls 16, 17, 18, 19 of the filter unit are manufactured from a porous, filtering material that is intended to catch pollutants and allows liquid to flow through the filter unit inwardly and outwardly in radial direction, see arrows 20, but liquid may also pass freely down through an annular flow path 22 and pass up through the inner, cylindrical liquid space 23 and outwardly through the filter wall 17, and see arrows 24, 25, 26. Due to the fact that the liquid flow 24, 25 changes direction at the bottom of the casing 7 heavier liquid particles are to a certain extent gathered at the bottom of the casing 7.

As is evident from the figures a first embodiment of the indicating device 1 according to the invention consists of an indicating tube 27 that is mounted in the transition between the inlet flow path 5, more precisely its lower end 28, that communicates with the annular flow path 22 of the liquid space 9. The indicating tube 27 preferably has a shape that is adapted to the cross-section of the flow path 22, i.e. including a tubular casing wall 29, an upper inlet opening 30 and a lower outlet opening 31. The casing wall 29 is shaped to adapt to the dimensions of the inlet tube at its end 28 in order to allow it to project into the lower part 2 of the filter device, i.e. below the non-transparent parts of the upper portion, including the nut 8. In order to prevent that the cross-section area of the through-going flow path 39 of the indicating tube 27 to a substantial degree is smaller than the area of the inlet flow path 5 the tube 27 is wider in peripheral direction along the annular flow path 22 compared to the radial measure of the tube relative to the axis 14. This is evident from the example according to FIGS. 4 and 5, where FIG. 4 shows a section through the indicating tube 27 along a central arc line in the flow path 22 while FIG. 5 shows an axial section along the axis 14. Thus, the cross-sectional shape of the tube 27 is preferably kidney-shaped. The transitional flow path 28 has preferably a corresponding cross-sectional shape or substantially rectangular shape. The indicating tube 27 has a thickened portion 32 at its top, said portion 32 having a downwards facing step 33 that rests against a projecting flange 34 of the filter unit at its upper edge 12. A projection 35 from the casing wall 16 of the filter unit contributes further to a positioning support against the indicating tube 27. Axial positioning vis-à-vis an incorrect position in height is further guaranteed by an upwards facing step 36 that cooperates with a downwards facing step 37 in the inlet flow path.

At its lower end, more precisely at its lower opening 31, the indicating tube 27 has an opening portion 38 according to a preferred embodiment of the invention. Said opening portion 38 is facing forwards, outwards or sidewards and forms a recess in the casing wall 29 that faces outwards towards the transparent casing 7 of the lower portion 2 of the filter device. The opening portion 38 may be designed as a U-shaped recess or quite simple by having the lower opening 31 inclined, i.e. the indicating tube 27 at its lower end being bevelled in order to have the opening facing both outwards and sidewards, see the opening edge 40 that is indicated by a dotted line in FIG. 4.

The indication of gas bubbles/air bubbles, usually caused by leakage, is effected according to the invention by having the liquid flowing to the filter unit through the inlet 5 to be forced through the indicating tube 27 and discharged through the lower opening 31, i.e. the indicating opening, before the liquid passes through the lower portion of the filter device and then exits through the outlet 6 to the device that is supplied with liquid, e.g. oil in case of an oil heating apparatus. By forcing the liquid to pass downwards to a level below the lower edge 13 of the upper, non-transparent portion 3 possible gas bubbles/air bubbles are forced along the same path and discharge through the indicating opening 31. Then the gas bubbles/air bubbles change direction and pass upwards along the outside of the tube. Since the indicating opening 31 is shaped with an outwards and sidewards facing opening portion 38 it is counteracted that the air bubbles move from the indicating opening 31 and radially inwards. Instead the air bubbles will pass out from the tube through the outwards facing opening portion 38. By this arrangement the air bubbles may be observed clearly and are not hidden by the casing wall of the indicating tube. It is not necessary that the opening portion 38 is facing both outwards and sidewards but it can face in one direction only.

When the indicating tube, as shown, is tightly attached to the inner side of the casing 7 air bubbles are in both cases forced to exit sidewards.

In FIGS. 6 and 7 a somewhat modified embodiment of the indicating device is shown in section, on one hand seen sideface, i.e. vertical section, and on the other hand seen from above. In this embodiment the indicating device does not constitute a separate tube but the indicating channel 39 is integrated with the transparent casing 7 of the filter. This is achieved by providing the casing 7 with an additional wall portion 41 that bulges inwards, said wall portion 41 being located at the lower end 28 of the inlet flow path 5 and extending downwards to be terminated by the opening portion 38. This portion 38 may have straight opening edges or may be bevelled as in the embodiment described above.

In this second embodiment there is no double wall, which results in that the liquid flow and also gas bubbles/air bubbles that are present are clearly visible from outside, not only at the opening but also along the entire channel.

A variant in-between of the two embodiments is that on the inner side of the casing the indicating tube and the casing is melt together or the indicating tube is adhered to the casing.

The principle of the method of indicating that air is present, usually due to leakage, is thus that the supplied liquid flow is forced down to a level below the non-transparent portion in order to have the supplied liquid flow to enter the transparent, lower portion and carrying possible air bubbles to a predetermined indicating spot. If in addition the time is measured from the start of the device generating the liquid flow, i.e. a pump to create negative pressure at the outlet side downstream the filter device, and up to the performance of gas bubbles/air bubbles it may be determined where the leakage is located upstream the filter device. This is possible by knowing the velocity of the liquid flow (flow through the pump) and hence the motion of the air bubbles. The covered distance during the measured time may be calculated and the location of the leakage may be determined.

The invention is not restricted to the example described above and disclosed in the drawings, but may be varied within the scope of the appending claims. For instance, the lower opening 38 of the indicating channel may entirely face downwards. If there is sufficient space between the casing 7 and the filter unit 11 the channel may be round, i.e. having circular or oval cross section. Apart from being arched (kidney-shaped) in cross section the channel may alternatively be rectangular. The channel may extend further down in the liquid space. The filter unit 11 may alternatively be a fully cylindrical unit with circular bottom. The steps 33, 36 may in principle be deleted. The different embodiments of the channel may be pertinent regardless if the channel is integrated with the transparent casing of the filter or in the shape of a separate tube. In principle, it is possible that gas bubbles/air bubbles are created in a liquid system without the presence of a leakage. Also in such cases the device may be used.

What is claimed is:

1. Device for indication of leakage in a liquid system, which includes liquid lines and a liquid filter that consists of a non-transparent upper portion having an inlet flow path for the supply of liquid to the filter and an outlet flow path for discharge of liquid from the filter, and a transparent lower portion having a transparent casing and a filter unit positioned inside said casing, wherein an indicating channel located proximate to the transparent casing is connected to the inlet flow path, said indicating channel extending below the upper portion and having an outlet opening that emerges in the lower portion and is arranged to discharge supplied liquid so as to be visible to a person's eye and also visually indicate gas bubbles/air bubbles that possibly are present during occurrence of any leakage.

2. The device according to claim 1, wherein the outlet opening of the indicating channel has an opening portion that counteracts the discharge of gas bubbles/air bubbles behind the indicating channel, seen from the outside of the liquid filter.

3. The device according to claim 2, wherein the opening portion is formed by a bevel or recess at the outlet opening of the indicating channel.

4. The device according to claim 3, wherein the opening portion of the indicating channel is provided both at front and at one side, such that the opening portion faces outwards and sidewards.

5. The device according to claim 1, wherein the indicating channel has a larger extension along the periphery of the filter unit than in a radial direction.

6. The device according to claim 5, wherein the indicating channel has a rectangular or kidney-shaped cross-section.

7. The device according to claim 1, wherein the indicating channel is defined by a separate tube that is provided in connection with the inlet flow path.

8. The device according to claim 1, wherein the indicating channel is integral with the transparent casing.

9. Method for indication of leakage in a liquid system, which includes liquid lines and a liquid filter device that consists of a non-transparent upper portion having an inlet flow path for the supply of liquid to the filter and an outlet flow path for discharge of liquid from the filter, and a transparent lower portion having a transparent casing and a filter unit positioned inside said casing, the method comprising:

feeding entering liquid through an indicating channel located proximate to the transparent casing down to the lower, transparent portion; and discharging the liquid in the transparent portion in order to make possible easy observations of any entering gas bubbles/air bubbles that are visible to a person's eye during occurrence of any leakage.

10. The method according to claim 9, said liquid system being connected to a pump device that pumps liquid through the liquid lines with a known velocity, wherein time is measured from the start of the pump device up to the moment when gas bubbles/air bubbles start to appear, whereby the location of the leakage is determined, by calculating the line distance from the filter device based on the known velocity of the liquid in the liquid lines.

* * * * *